(12) United States Patent
Mansour

(10) Patent No.: US 9,459,339 B2
(45) Date of Patent: Oct. 4, 2016

(54) KALMAN FILTER FOR INDOOR POSITIONING

(71) Applicant: TEXAS INSTRUMENTS INCORPORATED, Dallas, TX (US)

(72) Inventor: Mohamed Farouk Mansour, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 633 days.

(21) Appl. No.: 13/917,235

(22) Filed: Jun. 13, 2013

(65) Prior Publication Data

US 2014/0368386 A1 Dec. 18, 2014

(51) Int. Cl.
*G01S 3/02* (2006.01)
*G01S 5/02* (2010.01)

(52) U.S. Cl.
CPC .................................. *G01S 5/0294* (2013.01)

(58) Field of Classification Search
USPC ......... 342/450, 451, 461, 463–465; 701/479, 701/480
See application file for complete search history.

(56) References Cited

U.S. PATENT DOCUMENTS

| 8,688,139 | B2* | 4/2014 | Garin | G01S 5/0289 370/338 |
| 2012/0022779 | A1* | 1/2012 | Lee | G01S 19/21 701/408 |
| 2012/0221244 | A1* | 8/2012 | Georgy | G01C 21/165 701/472 |
| 2013/0310080 | A1* | 11/2013 | Palanki | G01S 5/0236 455/456.3 |

* cited by examiner

*Primary Examiner* — Dao Phan
(74) *Attorney, Agent, or Firm* — Ronald O. Neerings; Frank D. Cimino

(57) ABSTRACT

A position estimation method for indoor positioning includes filtering an initial position estimate that includes a corresponding covariance that reflects the quality of the geometry of the reference points and a previous initial position estimate that includes a corresponding covariance that reflects the quality of the geometry of the reference points by a Kalman filter to generate an updated previous position estimate, analyzing the updated previous position estimate to determine if the value is outside of a range, and constraining the updated previous position estimate based on the value being outside of the range.

14 Claims, 2 Drawing Sheets

KALMAN FILTER FOR INDOOR POSITIONING

CROSS-REFERENCE TO RELATED APPLICATION

Not applicable.

BACKGROUND

As mobile devices proliferate, the demand for services tailored to device location also increases. Location based services depend on positioning systems to determine device location. Satellite based positioning systems, such as the global positioning system (GPS), GLONASS, and Galileo can provide high accuracy, but require a clear line of sight between the satellites and the mobile device to provide a position determination. Consequently, satellite positioning systems are largely ineffective for indoor positioning.

As an alternative or an augmentation to satellite based positioning, wireless local area network (WLAN) based positioning systems have been developed. WLAN based positioning systems are suitable for indoor positioning and require minimal investment because they make use of existing infrastructure. WLAN based positioning systems determine mobile device position based on the established positions of WLAN access points visible to the device and the strength of signals exchanged between the mobile device and the access points.

SUMMARY

A position estimation method for indoor positioning includes filtering an initial position estimate that includes a corresponding covariance and a previous initial position estimate that includes a corresponding covariance by a Kalman filter to generate an updated previous position estimate, analyzing the updated previous position estimate to determine if the value is outside of a range, and constraining the updated previous position estimate based on the value being outside of the range.

Another embodiment for indoor positioning is a positioning system that includes a position estimator to determine a current position estimate and a corresponding covariance derived from a Wi-Fi dilution of position (WDOP) algorithm, a position smoother to update a previous position estimate using the current position estimate and a delayed position estimate, and a constraints module to limit a change in the updated previous position estimate with respect to a prior updated previous position estimate.

Yet another embodiment for indoor position is a wireless indoor positioning device that includes a delay element and a multiplexer to receive a current position estimate that includes a corresponding covariance and the delay element to delay the current position estimate, a first Kalman filter coupled to the output of the delay element and an output of a multiplexer (MUX) to generate an updated previous position estimate using the current position estimate and a delayed position estimate, and a constraints module, coupled to the first Kalman filter, to limit the change in the updated position estimate based on a difference between a prior updated previous position estimate and the updated previous position estimate, wherein the constraint will not be applied if the difference is within a range.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
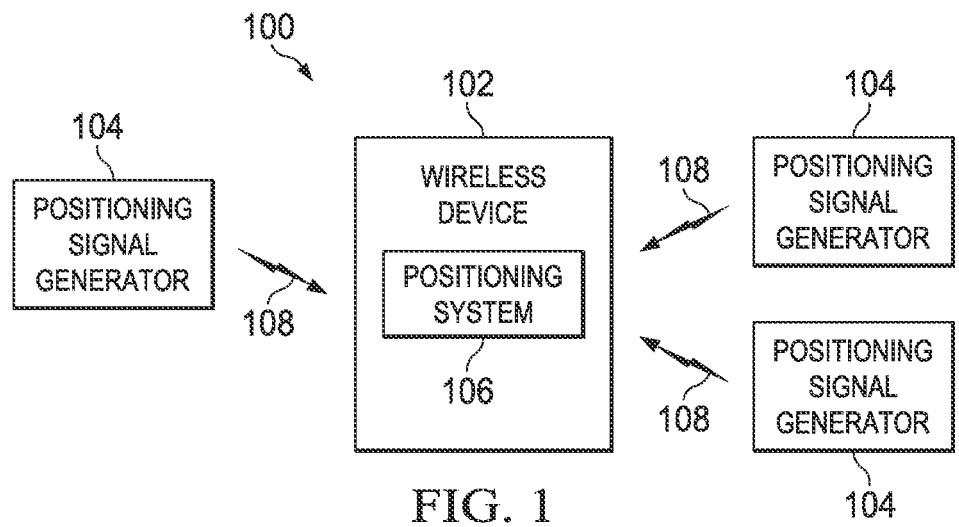
FIG. 1 shows a block diagram of a system 100 for determining the position of a wireless device based on Kalman filtering for indoor positioning in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

A Kalman filter, or a variant thereof, such as an extended Kalman filter, or multiple Kalman filters may be included in a positioning device to provide position estimation and to increase the accuracy of past position estimates. The Kalman filter generates a new position estimate based on previous position estimates and new positioning measurements, or the Kalman filter may provide an updated past position estimate based on current position estimates and delayed position estimates. The positioning measurements can take the form of time-of-flight (TOF) to references with known position (e.g., in satellite positioning systems), Angle-of-Arrival (AOA) to geometrically distributed references (e.g., in Radar applications), strength of the received signal (RSSI) for known references as in wireless local area network (WLAN) positioning applications, etc. For satellite positioning systems, WLAN positioning systems, and positioning systems in general, improved positioning accuracy is desirable.

Embodiments of the present disclosure provide improved positioning accuracy by delaying the position estimate by a time interval to incorporate additional data in the estimation calculating and by incorporating constraints into the positioning system. The constraints are applied to the position estimate to limit the amount of discontinuity in the estimate, but only when the position estimate changes more than a predetermined amount. Embodiments incorporate a constraints module into a Kalman smoother. The Kalman smoother may be comprise two Kalman filters and additional functional blocks and generates improved position estimates based on a current and a delayed position estimate.

FIG. 1 shows a block diagram of a system 100 for determining the position of a wireless device based on Kalman filtering for indoor positioning in accordance with various embodiments. The system 100 includes a wireless device 102 and a plurality of positioning signal generators 104. The positioning signal generators 104 may be positioning satellites, WLAN access points, or any other device configured to generate signals usable by the wireless device 102 for position determination.

The wireless device 102 is positioned to receive transmissions from and/or communicate with the positioning signal generators 104. The wireless device 102 may be a satellite positioning system receiver, a cellular telephone, a tablet computer, or any other mobile computing device configured to perform positioning based on the signals received from the positioning signal generators 104. While only three positioning signal generators 104 and a single wireless device 102 are shown in FIG. 1, in practice the system 100 may include any number of wireless devices 102 and positioning signal generators 104. The wireless device 102 is disposed in a geographic region 108.

The wireless device 102 includes a positioning system 106 that processes measurements of the positioning signals 110, and determines the location of the wireless device 102 based on the measurements. The positioning system 106 may determine the location of the wireless device 102 at set intervals, e.g. every 5 seconds. The positioning system 106 includes a Kalman smoother that generates position estimates at a current time and an updated position estimate for a previous time. For example, if the wireless device estimates a location at time t it may also provide a smoother or more accurate position, for time t−1. In such a manner, the wireless device 102 may trade accuracy for time delay in the position estimation. The positioning system 106 may also include a constraints module that limits the amount of jump the position estimate for the previous time estimate may experience in regards to displacement or velocity of the wireless device 102. The constraints module tests the position estimate generated at time t−1 against a predefined range. If the change between position estimates falls within the range, the constraints module does nothing. If, however, the change is outside of the range, then the constraints module may provide a correction measurement with an arbitrarily small covariance matrix that reflects the constraint to the Kalman smoother.

In some embodiments of the system 100, positioning signal generators 104 cooperate to determine the position of the device 102 based on signals reflected or generated by the device 102. In such embodiments, the positioning system 106 as described herein may be disposed in one or more of the positioning signal generators 104.

Figure 2:
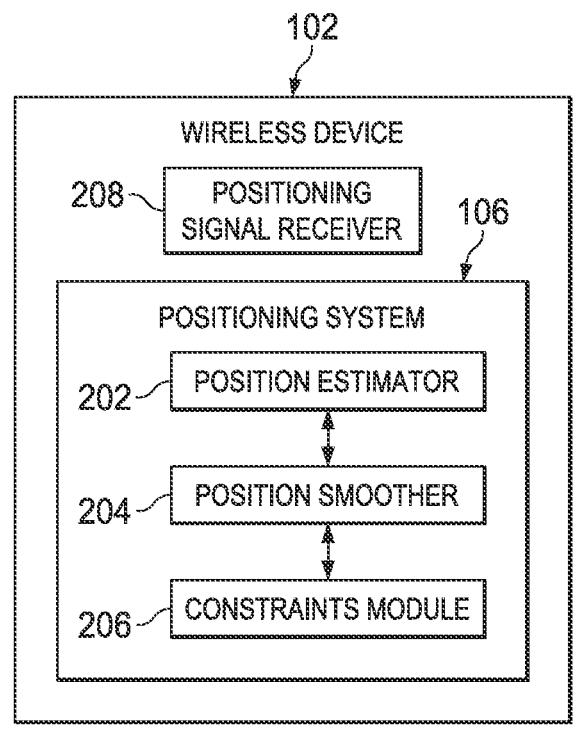
FIG. 2 shows a block diagram of a wireless device configured to perform Kalman filtering for indoor positioning in accordance with various embodiments.

FIG. 2 shows a block diagram of a wireless device 102 configured to perform Kalman filtering for indoor positioning in accordance with various embodiments. The wireless device 102 includes the positioning system 106 and a positioning signal receiver 208. The positioning signal receiver 208 receives the positioning signals 108 transmitted by the positioning signal generators 104. For example, the positioning signal receiver 208 may be a satellite signal receiver for reception of satellite positioning signals, a WLAN receiver for reception of access point transmissions used in WLAN positioning, or another type of receiver suitable for receiving signals used to determine the geographic position of a device. The positioning signal receiver 208 provides measurements derived from the received positioning signals 108 to the positioning system 106. The measurements may be, for example, TOF measurements, signal strength measurements, etc. The positioning signal receiver 208 may be separate from or integrated with the positioning system 106 in various embodiments of the wireless device 102.

The positioning system 106 generates position estimates based on the signal measurements provided by the positioning signal receiver 208. The positioning system 106 comprises positioning logic including a position estimator 202, a position smoother 204, and a constraints module 206. The position estimator 202 generates a first estimate of the current location of the wireless device 102 using, for example, received signal strength indicators (RSSI) data. The position estimator may use a minimum mean square error (MMSE) algorithm to analyze the RSSI data to generate a rough estimate of the wireless device 102 current location. The MMSE data may include an x and y coordinate and a corresponding covariance and may represent an initial position estimate of the wireless device 102. Additionally, the position estimator 202 may also determine a velocity and a corresponding covariance of the velocity for the wireless device 102. Alternatively, instead of implementing MMSE, the position estimator may use a maximum likelihood algorithm to roughly estimate the position of the wireless device 102. In such an implementation, the position estimator may use a Wi-Fi dilution of precision method (WDOP) to determine an initial estimate covariance of the wireless device 102's position based on the geometry of the reference points, the position signal generators 104. Regardless of the method used, the position estimator may supply the position smoother with a rough estimate of the current, instantaneous location of the wireless device 102.

WDOP may be characterized as a metric that provides a complete description of the wireless channel as well as the AP geometry. The WDOP utilizes a log-normal shadowing model for characterizing the wireless channel. The WDOP algorithm for a particular channel model may encompass the AP geometry as well as the path loss exponent of each channel. The WDOP may directly relate to the expected variance of the final positioning error to the variance of the power measurements taken by the positioning system 106. Since the WDOP captures both the geometry and channel modeling, it can be used as a universal measure of performance regardless of the underlying access point geometrical distribution. In general, a WDOP matrix may describe the quality of the reference point geometry in a WLAN and may be used as a confidence measure of the initial position estimate. The WDOP may also be function of the number of APs that make up a WLAN and their distribution.

The WDOP algorithm may link the position error in RSSI-based positioning to the error in the RSSI measurements from different WLAN APs such as the positioning signal generators 104. The WDOP calculation may only be used when position estimates are made in a WLAN environment. The WDOP calculation may encompass both the AP geometry and the channel behavior of the environment the wireless device 102 is located. The WDOP algorithm may be defined as Trace $\{(H^TH)^{-1}\}$, where $H=[a_{xi}, a_{yi}]$, a matrix that describes the power measurement in terms of the log-normal shadowing model for each AP, $a_{xi}=[-n_i/\log(10)]*[(x-x_i)/((x-x_i)^2+(y-y_i)^2)]$, and $a_{yi}=[-n_i/\log(10)]*[(y-y_i)/$ $((x-x_i)^2+(y-y_i)^2)]$ where x and y are the coordinates of the wireless device 102 position, $x_i$ and $y_i$ are the coordinates of the ith AP, and $n_i$ is the path loss exponent of the channel between the wireless device 102 and the ith AP. The H matrix may be of size i×2, where i will be the number of visible APs and each row will be the change in the log-normal shadowing model for the x and y coordinates for each AP. Calculating the trace of the $\{(H^T H)^{-1}\}$ will give the WDOP for that AP geometry and may be used as the covariance in the position estimate by the position smoother 204.

The position smoother 204 may generate a smoother, or more accurate, position estimate for either the current position or for a previous position, or both. The position smoother 204 may take the rough, current location estimate from the position estimator 202 and filter it using a Kalman filter to obtain a smoother position estimate for the current position. Further, the position smoother 204 may also filter the current rough estimate along with a previous rough position estimate by a Kalman filter to generate a smoother, more accurate position for the previous position. For example, if a rough position estimate at time t is filtered with a rough position estimate at time t−1, then the position smoother may generate a smoothed position estimate at time t−1.

Further, the position smoother may limit, or constrain, the smoothed previous position estimate based on various constraints. The constraints module 206 may evaluate the smoothed previous position estimate to determine if he value is outside of a range. If the value is not outside of the range, then the constraints module 206 may not affect the value. However, if the value is outside of the range, then the constraints module 206 may limit the value at a maximum, or minimum. The constraints module may constrain the smoothed previous position estimate by limiting the amount of displacement between estimates or by limiting the velocity of the estimate. This may be performed by providing a correction measurement to the Kalman filter that describes the constraints and setting the corresponding measurement covariance matrix to be arbitrarily small. Additionally, the constraints module may apply map constraints to the estimates to ensure the estimates are within an allowable region of a map. All these constraints may be provided as measurements to the Kalman filter.

Various components of the wireless device 102 including at least some portions of the positioning system 106 can be implemented using a processor executing software programming that causes the processor to perform the operations described herein. In some embodiments, the positioning system 106 includes a processor executing software instructions that cause the processor to generate position estimates via Kalman filtering and to refine the position estimates using information provided to the Kalman filters as described herein.

Suitable processors include, for example, general-purpose microprocessors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. Software programming (i.e., processor executable instructions) that causes a processor to perform the operations disclosed herein can be stored in a computer readable storage medium. A computer readable storage medium comprises volatile storage such as random access memory, non-volatile storage (e.g., a hard drive, an optical storage device (e.g., CD or DVD), FLASH storage, read-only-memory), or combinations thereof. Processors execute software instructions. Software instructions alone are incapable of performing a function. Therefore, in the present disclosure any reference to a function performed by software instructions, or to software instructions performing a function is simply a shorthand means for stating that the function is performed by a processor executing the instructions.

In some embodiments, portions of the wireless device 102, including portions of the positioning system 106 may be implemented using dedicated circuitry (e.g., dedicated circuitry implemented in an integrated circuit). Some embodiments may use a combination of dedicated circuitry and a processor executing suitable software. For example, some portions of the positioning system 106 may be implemented using a processor or hardware circuitry. Selection of a hardware or processor/software implementation of embodiments is a design choice based on a variety of factors, such as cost, time to implement, and the ability to incorporate changed or additional functionality in the future.

Figure 3:
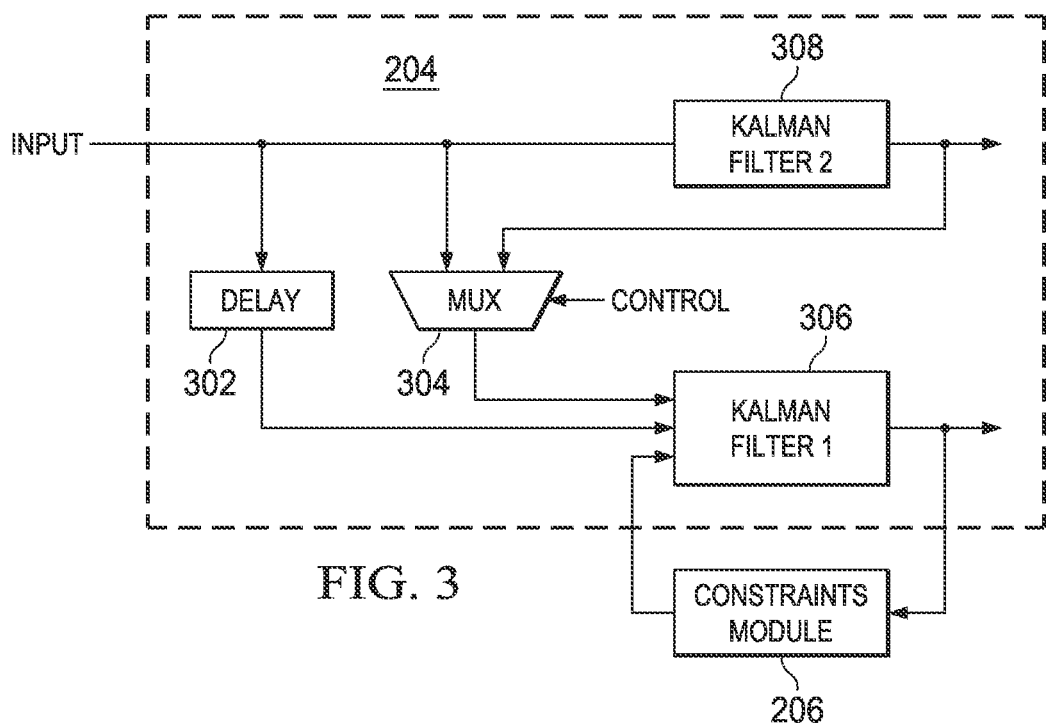
FIG. 3 shows a block diagram of a position smoother configured to perform Kalman filtering for indoor positioning in accordance with various embodiments.

FIG. 3 shows a block diagram of a position smoother configured to perform Kalman filtering for indoor positioning in accordance with various embodiments. The position smoother 204 may be a part of the positioning system 106 and comprise a delay element 302, a multiplexer (MUX) 304, a first Kalman filter 306, and a second Kalman filter 308. Additionally, the position smoother 204 may also receive a correction measurement from the constraints module 206 to limit the output of the first Kalman filter 306.

The position smoother 204 may receive the MMSE data that includes the related covariance, or an initial position estimate and the corresponding covariance, generated by the position estimator 202. The MMSE data may be an input to the delay element 302, the MUX 304, and the second Kalman filter 308. An output of the second Kalman filter 308 may represent an instantaneous position estimate for time t and may be an input to the MUX 304 so that the MUX 304, based on a control signal, may select to output either the MMSE data or the output of the second Kalman filter 308. The delay element 302 delays, or holds, the MMSE data for one time period or one cycle of the position smoother 204. For example, if the position smoother is providing a smoother position estimate, or updated previous position estimate, every 5 seconds, then the delay element may hold the MMSE data from the prior position estimate operation, or for 5 seconds.

The second Kalman filter 308 may filter the MMSE data for a current time to generate a more accurate current position estimate, also referred to as an instantaneous position estimate, of the wireless device 102. The second Kalman filter 308 may implement standard Kalman filtering algorithms to generate the instantaneous estimate of the wireless device 102. In one embodiment, the output of the second Kalman filter 308 may be the final output of the position smoother 204. In such an embodiment, the position smoother may generate a more accurate position estimate for time t. Further, the instantaneous position estimate generated by the second Kalman filter 308 may be an input to the first Kalman filter 306 for use in smoothing a previous position estimate.

In accordance with various embodiments, the MMSE data for a current position and the MMSE data for a previous position estimate may be used by the first Kalman filter 306 to generate a smoothed previous position estimate. The MMSE data for a current position estimate may be received by the first Kalman filter 306 via the MUX 304 and the MMSE data for the previous position estimate may be received from the delay element 302. In this embodiment, the first Kalman filter 306 may utilize conventional Kalman filtering algorithms to filter the previous and current MMSE data to generate a more accurate or smoothed estimate for the previous position calculated by the positioning system 106.

In accordance with various other embodiments, the MMSE data for a previous MMSE estimate and the output of the second Kalman filter 308, the instantaneous position estimate, may be used by the first Kalman filter 306 to generate a smoothed, or updated, previous position estimate. In this embodiment, the delay element may provide the previous MMSE estimate and the MUX 304 may provide the output of the second Kalman filter 308 to the first Kalman filter 306. The first Kalman filter 306 may filter the inputs together using standard Kalman filtering algorithms to generate a smoothed position estimate.

For example, the position smoother 204 receives MMSE data at time t, or the current time. The time t MMSE data is received by the delay element 302, the MUX 304, and the second Kalman filter 308. The second Kalman filter 308 may generate an instantaneous position estimate for time t using the MMSE data for time t. Further, at time t, the delay element may output MMSE data at time t−1, which was received by the delay element 302 and delayed from a previous input, time t−1. The inputs to the first Kalman filter 306 at time t may then be the MMSE data for time t−1 from the delay element 302, and the MMSE data for time t for when the MUX 304 is set to output the MMSE data. The output of the first Kalman filter 306 may then be a smoothed position estimate for time t−1.

Alternatively, the MUX 304 may be set to output the instantaneous position estimate for time t from the second Kalman filter 308. In this embodiment, the first Kalman filter 306 may still output a smoothed position estimate for time t−1. However, the smoothed position estimate for time t−1 may be slightly more accurate due to having already been previously filtered by the second Kalman filter 308. Yet, in either embodiment, the output of the position smoother 204 may be the smoothed position estimate at time t−1.

Further, the number of states used by the first and second Kalman filters 306, 308 may filter the position estimates using either four or six state matrices. The four-state vector may be $x_t = [x(t) y(t) v_x(t) v_y(t)]^T$ and the corresponding state transition matrix is $$\Phi_t = \begin{pmatrix} I & \Delta tI \\ 0 & I \end{pmatrix} \quad (1)$$

where I is the identity matrix of size 2. The six-state vector is $x_t = [x(t) y(t) x(t-1) y(t-1) v_x(t) v_y(t)]^T$ and the corresponding state transition matrix is $$\Phi_t = \begin{pmatrix} I & 0 & \Delta tI \\ I & 0 & 0 \\ 0 & 0 & I \end{pmatrix} \quad (2)$$

For the second Kalman filter 308, which may employ common filtering equations to produce the instantaneous position estimate, the measurement matrix may have the following form $$H_t = \begin{pmatrix} 1 & 0 & 0 & 0 \\ 0 & 1 & 0 & 0 \end{pmatrix}. \quad (3)$$

The covariance of the measurement matrix, as discussed above, may be a combination of the variance of the MMSE data and the WDOP, which is a quality of WLAN AP geometry.

The first Kalman filter 306 may have a similar dynamic system with respect to the delayed measurements. Future estimates and other constraints may smooth the previous position estimate. Thus, the state transition matrix may be an identity matrix and the difference may be included in the second Kalman filter 306's measurement matrix. Assuming the overall delay by the delay element 302 to be d, there are two embodiments for future information (future information in this context refers to updating a previous position estimate using current position estimate information)—using the MMSE data as an input to the first Kalman filter 306 or using the instantaneous position estimate as the input. For smoothing using the MMSE data, the second Kalman filter 306's measurement matrix becomes $$H_{t-d} = \begin{pmatrix} 1 & 0 & 0 & 0 \\ 0 & 1 & 0 & 0 \end{pmatrix} \cdot \Phi_t \ldots \Phi_{t-d+1}. \quad (4)$$

For smoothing using the instantaneous position estimate, the second Kalman filter 306's measurement matrix becomes $$H_{t-d} = \Phi_t \ldots \Phi_{t-d+1}. \quad (5)$$

In addition to providing a smoother, more accurate position estimate for the previous time, the output of the position smoother may be constrained or limited by the constraints module 206. The constraints module 206 may first evaluate the output of the first Kalman filter 306. The evaluation may take the form of comparing the output (i.e., the smoothed position estimate at time t−1) to a prior output. If the evaluation, or comparison, shows that the difference between the two estimates is greater than, or less than, a defined range, then the constraints module may limit the output for time t−1 to the maximum defined by the range by providing the constraint as a measurement with arbitrarily small covariance to the first Kalman filter 306. Alternatively, the covariance associated with the MMSE data may be increased and the Kalman filtering performed by the first Kalman filter 306 may be re-performed.

The constraints may be enforced on the updated previous position estimate and/or the velocity. If the updated previous position estimate is outside of a range of acceptable change, then the measurement covariance is increased and the filtering performed by the second Kalman filter 306 may be re-performed. If the re-filtering does not correct the estimate, then the constraint is enforced by providing the constraint as a measurement with a small covariance to the second Kalman filter 306 for yet another filtering. The constraint may have the form $$(x(t)-x(t-1))^2 + (y(t)-y(t-1))^2 \leq (\Delta t \times v_{max})^2 \quad (6)$$

where $v_{max}$ is determined by a velocity control parameter. This is a non-linear condition that needs to be linearized before being fed to the second Kalman filter 306. A first-order Taylor expansion may be used to linearize equation 6, and the linearized version is $$f(x_1) = f(x_0) + \nabla f(x_0)(x_1 - x_0). \quad (7)$$

Where $x_0$ refers to the old estimate of (x(t), y(t)), and $x_1$ refers to the corrected estimate of (x(t), y(t)). To satisfy the constraint, f(x1) may equal $(\Delta t \times v_{max})^2$, which leads to $$\nabla f(x_0) = [2(x(t)-x(t-1)) 2(y(t)-y(t-1))]. \qquad (8)$$

Thus, the linearized condition has the following form $$\nabla f(x_0)[x(t)y(t)]^T = (\Delta t \times v_{max})^2 - (x(t)-x(t-1))^2 - (y(t)-y(t-1))^2 + \nabla f(x_0) * x_0. \qquad (9)$$

If equation (6) is not satisfied, then the right side of equation (9) along with the corresponding measurement matrix [f(x₀) 0 0] (from the left side of (9)) is used as a measurement and is an input to the first Kalman filter 306 to constrain the displacement of the updated previous position estimate. Additionally or alternatively, a constraint may be set on the velocity of the position change.

Figure 4:
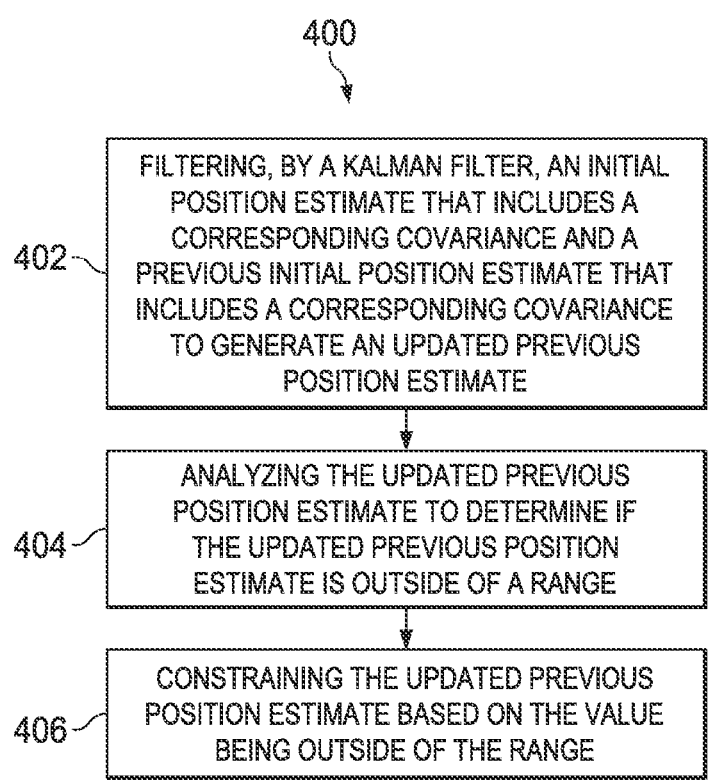
FIG. 4 shows a flow diagram for a method for Kalman filtering for indoor positioning in accordance with various embodiments.

FIG. 4 shows a flow diagram for a method 400 for Kalman filtering for indoor positioning in accordance with various embodiments. Though depicted sequentially as a matter of convenience, at least some of the actions shown can be performed in a different order and/or performed in parallel. Additionally, some embodiments may perform only some of the actions shown. The operations of the method 400 can be performed by the positioning system 106. In some embodiments, at least some of the operations of the method 400, as well as other operations described herein, can be performed by a processor of the positioning system 106 executing instructions stored in a computer readable storage medium.

In block 402, the method 400 begins with filtering, by a Kalman filter, an initial position estimate that includes a corresponding covariance and a previous initial position estimate that includes a corresponding covariance to generate an updated previous position estimate. The generation of the updated previous position estimate is similar to the generation of the smoothed position estimate for time t–1 generated by the first Kalman filter 306 using the delayed MMSE data from time t–1 and either the MMSE data from time t or the instantaneous position estimate for time t generated by the second Kalman filter 308 as inputs.

In block 404, the method 400 continues with analyzing the updated previous position estimate to determine if the updated previous position estimate is outside of a range. Analyzing the updated previous position estimate may be carried out by a constraints module, such as constraints module 206, and may determine if the change in the updated previous position estimate with respect to a prior estimate is outside either a range set for changes in displacement or in velocity. If the change between the two estimates is not outside of the range, then the constraints module 206 may remain idle.

In block 406, the method 400 continues with constraining the updated previous position estimate based on the value of the estimate being outside of the range. The constraints module 206 may constrain the previous position estimate if the change between the prior estimate and the current estimate is greater, or less than, a defined range. The defined range, as noted, may limit a minimum or maximum displacement the wireless device 102 may make between position estimates. Alternatively, the velocity of the wireless device 102 may be a limiting factor when generating an updated previous position estimate by the positioning system 106.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A positioning system, comprising:
    a position estimator to determine a current position estimate and a corresponding covariance derived from a Wi-Fi dilution of position (WDOP) algorithm;
    a position smoother to update a previous position estimate using the current position estimate and a delayed position estimate;
    a constraints module to limit a change in the updated previous position estimate with respect to a prior updated previous position estimate; and
    an ouput means to communicate a position of the system.

2. The system of claim 1, the position smoother comprising:
    a delay element to delay a position estimate;
    a multiplexer (MUX) to receive the current position estimate; and
    a first Kalman filter coupled to an output of the delay element and an output of the MUX to update the previous position estimate.

3. The system of claim 1, further comprising:
    a second Kalman filter to filter the current position estimate and an output of the second Kalman filter coupled to an input of the MUX.

4. The system of claim 2, wherein the MUX receives a control signal that directs the MUX to output either the current position estimate or the output of the second Kalman filter.

5. The system of claim 1, wherein the constraints module and the position smoother analyze the updated previous position estimate to determine if the data is outside of a range.

6. The system of claim 5, wherein the constraints module provides a correction measurement and a small covariance to the first Kalman filter based on the constraints module determining that the updated previous position estimate is outside of the range to limit the previous position estimate.

7. The system of claim 6, wherein the position estimator calculates the corresponding covariance using a Wi-Fi dilution of position (WDOP) algorithm that reflects a quality of the geometry of a plurality of wireless local area network access points based on the initial position estimate.

8. A wireless indoor positioning device, comprising:
    a delay element and a multiplexer to receive a current position estimate that includes a corresponding covariance and the delay element to delay the current position estimate;
    a first Kalman filter coupled to the output of the delay element and an output of a multiplexer (MUX) to generate an updated previous position estimate using the current position estimate and a delayed position estimate;
    a constraints module, coupled to the first Kalman filter, to limit the change in the updated position estimate based on a difference between a prior updated previous position estimate and the updated previous position estimate, wherein the constraint will not be applied if the difference is within a range; and
    an ouput means to communicate a position of the system.

9. The device of claim 8, wherein the constraints module limits the updated previous position estimate based on the difference being outside of the range.

10. The device of claim 8, further comprising a second Kalman filter to receive the current position estimate and to generate an instantaneous position estimate.

11. The device of claim 10, wherein an output of the second Kalman filter is coupled to an input of the MUX and the MUX outputs either the current position estimate or the instantaneous position estimate based on a control signal.

12. The device of claim 8, wherein the corresponding covariance is calculated by a measurement engine using a Wi-Fi dilution of precision method (WDOP) that reflects a quality of the geometry of a plurality of wireless local area network access points based on the initial position estimate.

13. The device of claim 8, wherein the constraints module provides a correction measurement with a corresponding small covariance to limit the updated previous position estimate.

14. The device of claim 8, wherein the current position estimate contains a coordinate and a velocity describing the current estimate of the device's position and an estimate of the velocity of the device.

* * * * *